G. C. HOSCH AND G. B. KYLE.
CLOTH MEASURING AND COST COMPUTING MACHINE.
APPLICATION FILED MAR. 27, 1920.

1,421,943.

Patented July 4, 1922.
3 SHEETS—SHEET 1.

Inventors—
Green Carlton Hosch.
George B. Kyle.
By Elliott & Neaumer
Attorneys.

G. C. HOSCH AND G. B. KYLE.
CLOTH MEASURING AND COST COMPUTING MACHINE.
APPLICATION FILED MAR. 27, 1920.

1,421,943.

Patented July 4, 1922.
3 SHEETS—SHEET 2.

Inventors:-
Green Carlton Hosch
George B. Kyle.
By Elliott & Ammen
Attorneys.

UNITED STATES PATENT OFFICE.

GREENE CARLTON HOSCH AND GEORGE B. KYLE, OF ST. LOUIS, MISSOURI, ASSIGNORS TO THE MEASUREGRAPH COMPANY, OF ST. LOUIS, MISSOURI, A CORPORATION OF DELAWARE.

CLOTH-MEASURING AND COST-COMPUTING MACHINE.

1,421,943.   Specification of Letters Patent.   Patented July 4, 1922.

Application filed March 27, 1920. Serial No. 369,363.

*To all whom it may concern:*

Be it known that we, GREENE CARLTON HOSCH and GEORGE B. KYLE, citizens of the United States, residing in the city of St. Louis and State of Missouri, have invented new and useful Improvements in Cloth-Measuring and Cost-Computing Machines, of which the following is a specification.

This invention relates to fabric measuring and cost-computing machines, and the general object of the invention is to produce a very simple machine so constructed that all of the necessary operations can be controlled by a single controlling member. By doing this, we reduce the number of parts, and simplify greatly the construction of the machine. The type of machine to which we have applied our invention involves the use of an indicating chart or web which carries computed numbers co-operating with a fixed scale to indicate the charge to be made for a measured quantity of fabric which is shown by a suitable indicating wheel or dial. In being measured, the fabric passes over a measuring roller against which it is pressed by a presser-roller. In the operation of the machine, it is necessary to hold the presser-roller away from the measuring roller while positioning the fabric in the machine for measurement, and it is also necessary to provide for releasing the presser-roller to permit it to descend upon the measuring roller. The mechanism also includes returning means for returning the chart or measuring dial to zero after an operation.

According to our invention we control the raising of the presser-roller away from the measuring roller, and the releasing of the presser-roller to permit it to descend upon the measuring roller; this control is effected by a single controlling member, and in addition to this we utilize this same controlling member to control the returning mechanism. In other words, we completely control the operation of the machine by means of a single controlling member. Furthermore, we place this controlling member in such a relation to the casing that it operates as an aligning device for the forward edge of the fabric in being measured, and so that an accurate measurement of the cloth will result. In this way, we avoid inaccuracies which tend to occur in operating such machines and which usually result in giving the customer a little more fabric than is actually measured by the machine.

Further objects of the invention will appear hereinafter.

The invention consists in the novel features, and in the general combination of parts to be particularly described hereinafter, all of which contribute to produce a simple and efficient cloth measuring and cost-computing machine. A preferred embodiment of the invention will be particularly described in the following specification, while the broad scope of the invention will be pointed out in the appended claims.

Figures 6, 7:
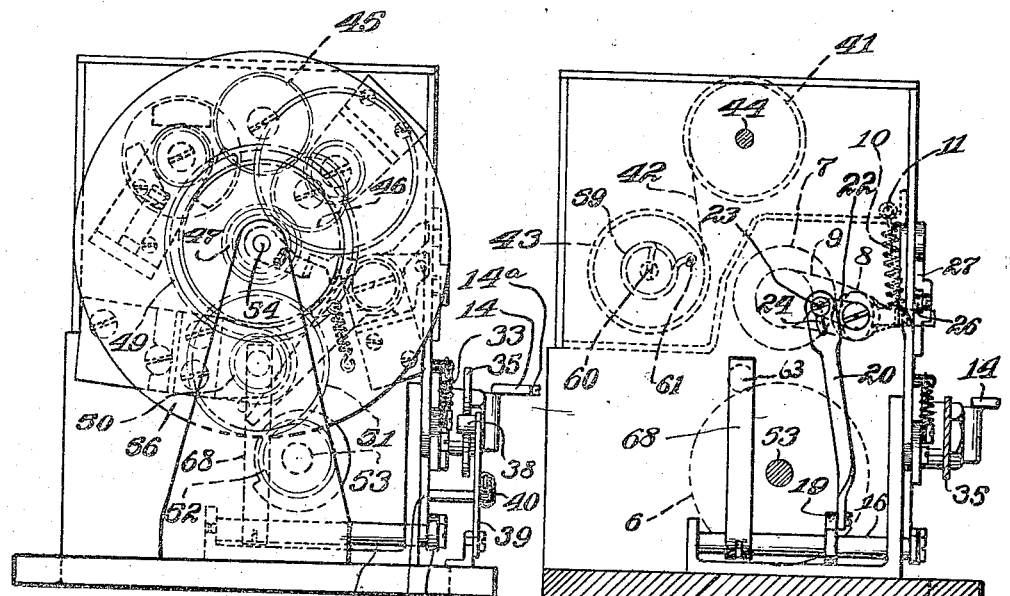
Figures 2, 3, 8:
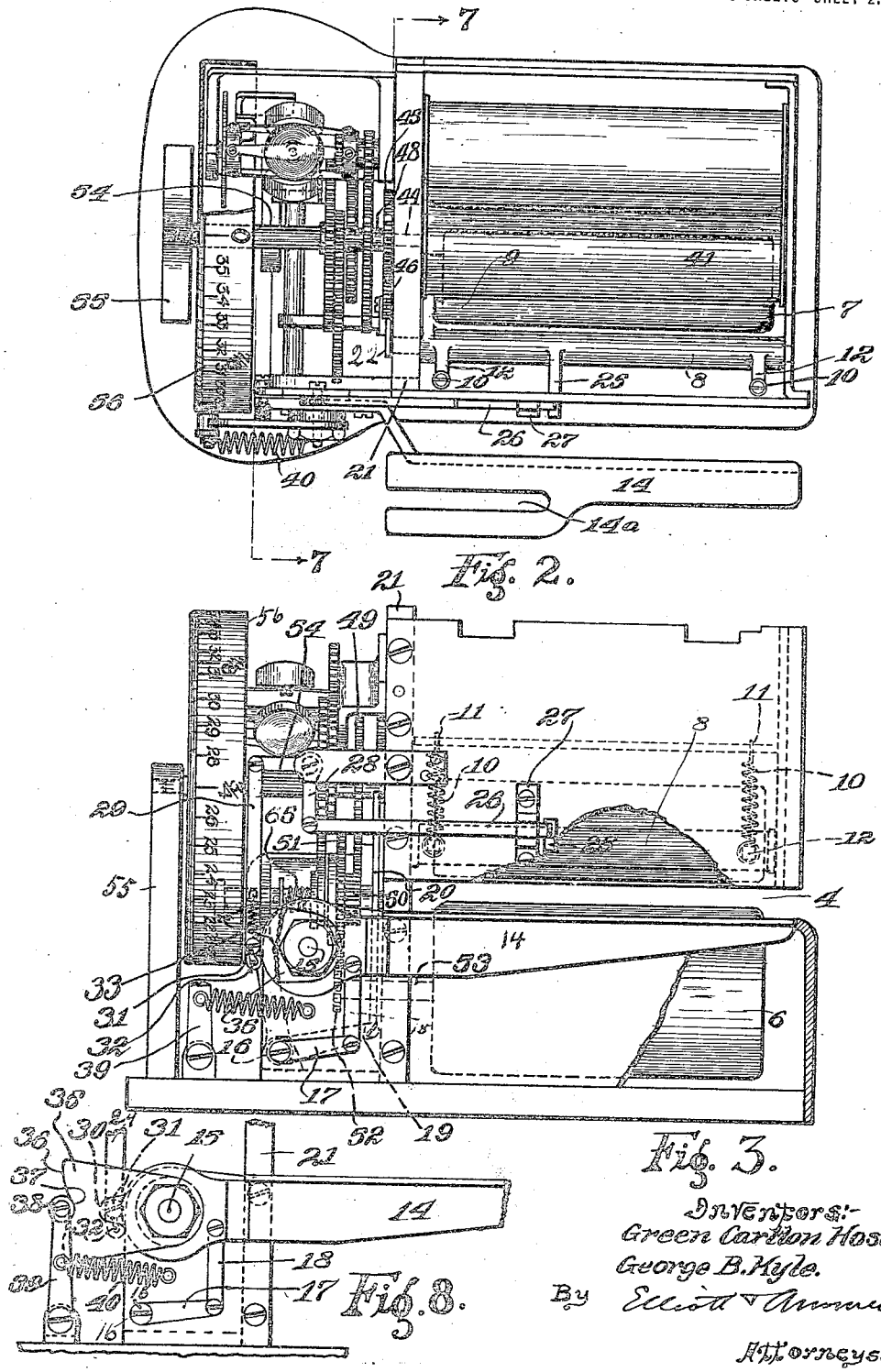
Figure 2 is a plan of the machine with the casing removed.
Figure 3 is a side elevation of the machine as shown in Figure 2, but with certain parts broken away; this view shows the controlling member 14 in its normal or neutral position.
Figure 5:
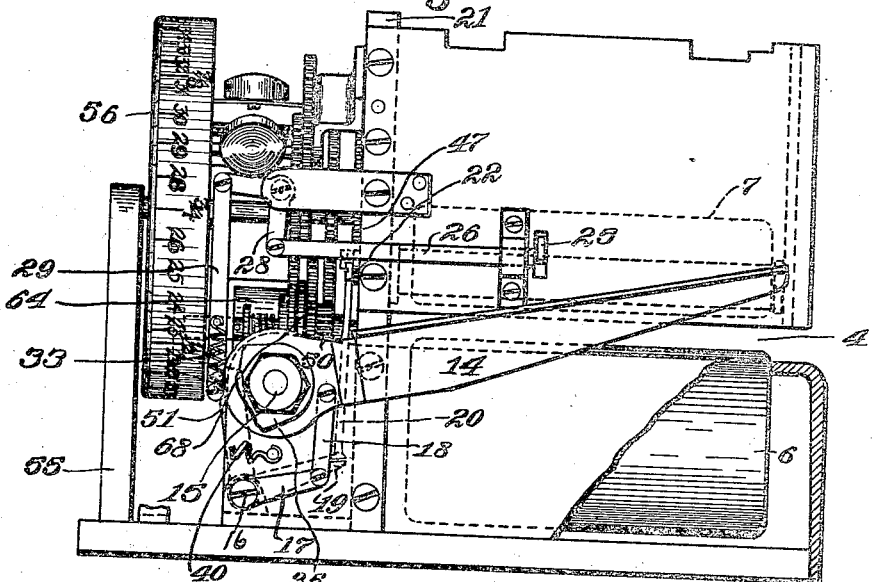
Figure 5 is a view similar to Figure 4, but showing the controlling member in its elevated position.
Figure 5A:
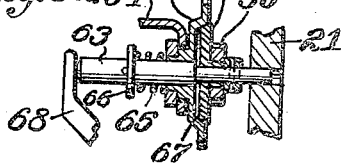

Figure 5$^a$ is a vertical section taken through a clutch and illustrating details of this feature of the mechanism;

Figure 6 is an end elevation of the machine as illustrated in Figure 2 and viewed from the left;

Figure 7 is a vertical section through the machine taken about on the line 7—7 of Figure 2, but with many parts omitted, the purpose of this view being to illustrate the means for raising the presser-roller for controlling the returning mechanism or returning means which returns the indicating mechanism to zero; and Figure 8 is a detailed side elevation, further illustrating details of the parts associated with the controlling member.

The mechanism of the machine is mounted within a suitable casing 1 which has an alignment or head 2 at one end and substantially rectangular body portion 3. This casing or housing, in its lower portion, has a horizontal gap 4 (see Fig. 3) formed through the casing to permit the fabric 5 to be pulled through the machine. In passing through the machine, the fabric rotates the measuring roller 6 (see Figs. 3 and 7), which is mounted to rotate in the lower portion of the housing and below the gap 4. Above the gap we provide a presser-roller 7 which co-operates with the measuring roller to press the fabric against it.

Any suitable means is provided for mounting this presser-roller so that it can be held against the face of the measuring roller, or held away from the same to permit the fabric to be placed between the rollers. For this purpose we prefer to mount the presser-roller on a movable presser-roller frame, which may be in the form of a rock-shaft 8 (see Fig. 2) having an arm 9 on which the presser-roller is supported. The presser-roller is forced toward the measuring roller by means of two coil springs 10 (see Figs. 2 and 7), the upper ends of which are attached at 11 (see Fig. 7), and the lower ends of which are attached to two short arms 12 which project from the rock-shaft 8 on the side opposite to the presser-roller 7.

Figure 1:
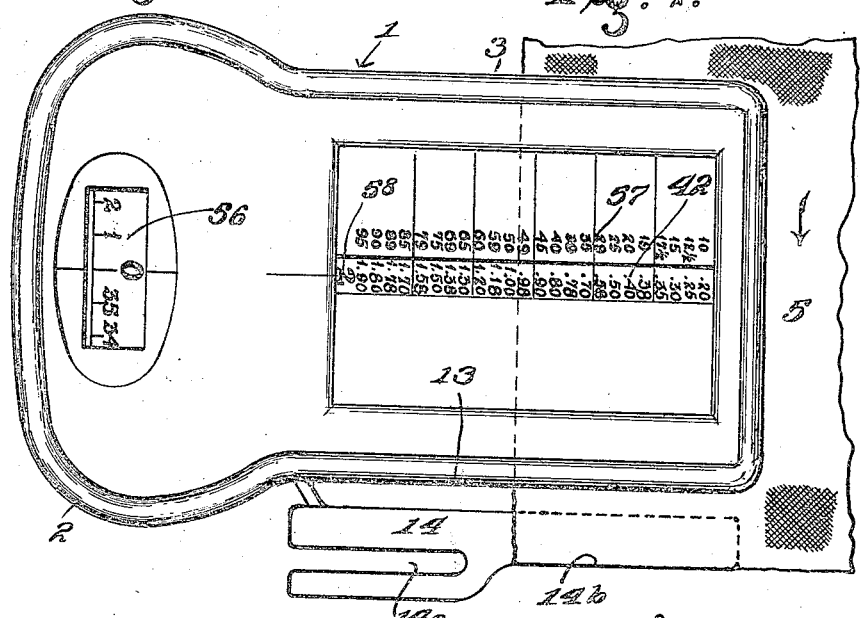
Figure 1 is a plan of a machine embodying our invention and illustrating a piece of fabric passing through the machine.

It should be understood that in using the machine, the fabric is pulled through it in the direction indicated by the arrow in Figure 1, and hence the fabric emerges from the gap 4 at the side 13 of the casing. This side of the casing we provide with a controlling member 14 which preferably extends transversely to the path of the fabric and is normally disposed in a substantially horizontal plane in such a way that the fabric is pulled across the controlling member in pulling it through the machine; hence, in one aspect, the controlling member may be regarded as a shelf for supporting the forward edge of the fabric. This controlling member may be mounted to move in any suitable manner, but we prefer to hold it normally in a neutral or horizontal position. It extends longitudinally with the measuring roller.

We provide means connecting the controlling member with the presser-roller frame to enable it to raise the presser-roller frame. Associated with the presser-roller frame we provide latching means or a latch, for latching it away from the measuring roller when it has been raised. The movement of the controlling member in one direction operates through the connection to the presser-roller frame to raise the roller, and we provide a connection from the controlling member to the latch, so that a movement of the controlling member in the opposite direction will move the latch to release the presser-roller frame and permit the presser-roller to descend on the measuring roller. In order to accomplish this, the controlling member 14 may be in the form of a lever mounted to rotate about a suitable pivot pin 15. The presser-roller frame may be lifted by an upward movement of the controlling member 14. Any suitable connection may be provided for this purpose, but this connection should include a lost-motion device which will permit the presser roller frame to descend under the action of its springs 10 when the presser-roller frame is unlatched or released from the latch. In order to accomplish this we provide a rock-shaft 16 (see Fig. 7), which carries a rigid arm 17 actuated by a link 18, (see Fig. 8). This rock-shaft 16 carries a rigid arm 19 (see Fig. 3) and this arm carries a link 20 (see Fig. 7) which extends upwardly to a point near the presser-roller frame, on the opposite side of a vertical frame plate 21 (see Fig. 3). The end of the rock-shaft 8 of the presser-roller frame extends through this frame plate 21 and carries a rigid arm 22 (see Fig. 7). The lost-motion device referred to may be in the form of a pin-and-slot, the pin 23 being carried on the arm 22 and received in a curved slot 24 in the upper end of the link 20. It will be evident that if the controlling member 14 is raised, the link 18 will pull up on the arm 17 and this will produce a thrust in the twisted link 20. The lower end of the slot 24 will engage the pin 23 and will rock the presser-roller frame so as to raise the presser-roller 7.

Any suitable means may be provided for latching the presser-roller frame in its raised position and for controlling the latch from the controlling member 14. For this purpose we may provide the rock-shaft 8 with a laterally projecting arm 25 (see Fig. 2) which swings downwardly when the presser-roller 7 swings upwardly. When this arm 25 descends sufficiently, it will be held down by latching means including a latch 26 (see Fig. 3), which may be in the form of a bolt or bar guided to slide through a suitable guide-bracket 27. A spring is associated with this latch to cause the latch to snap over the arm 25 when the same is depressed. However, this spring need not be attached directly to the latch 26, as will presently appear. The latch 26 is attached to a bell crank lever 28, the horizontal arm of which is connected by a link 29 with a lug 30 (see Fig. 8) which projects from the head of the controlling member 14; that is to say, this lug 30 is located beyond the pivot pin 15. A lost-motion connection is provided to permit the latch to move independently of the controlling member 14, when the latch is moving forward to hold the arm 20 depressed. This lost-motion device may be in the form of a pin-and-slot, that is to say, a pin 31 carried in the lug 30 passing through a curved slot 32 in the lower end of the link 29. It will now be evident that if the controlling member 14 is moved downwardly, an upward thrust will be exerted in the link 29 which will withdraw the latch or bolt 26 so as to release the arm 25. In connection with the mode of operation of the arm 25 and the latch 26, it should be understood that when the arm 25 is in its raised position, the end of the latch 26 simply lies against the side face of the arm. When the arm 25 moves downwardly into the position in which it is indicated in Figure 3, a spring 33 will pull down on the link 29 and slide the latch 26 over the arm. The slot 32 of course, will permit the latch 26 to move independently of the controlling member when the latch is co-operating with the arm 25 to latch the presser-roller in its raised position. The spring 33 connects pin 31 with a point on link 29.

Suitable means is provided for holding the controlling member in its normal or neutral position (see Figs. 3 and 8). This may be accomplished by means of a spring associated with the controlling member 14 in any suitable manner. In the present instance, we have shown the controlling member 14 with a tail plate 35 having a cam edge 36 with a notch 37 at the middle point of the cam. A roller 38 is provided on a pivoted arm 39 which is pulled toward the cam by a strong coil spring 40. Evidently this spring and arm will tend to hold the controlling member 14 in its neutral or horizontal position and will return it to this position if it is moved in either direction therefrom.

The machine may have any suitable indicating mechanism which may be driven in any suitable manner by the measuring roller 6. In the present instance the indicating mechanism includes a drum or take-up roller 41 (see Fig. 7), upon which winds a chart 42, the lower portion of the chart 42 being normally held in coils on the lower drum 43. The shaft 44 of the take-up roller 41 carries a gear wheel 45 and this gear wheel is driven by an idle gear 46 (see Figs. 2 and 6) which is attached to the side of the frame plate 21. This gear 46 meshes with a gear 47 (see Fig. 6) which is carried on the inner end of a sleeve 48, the outer end of the sleeve 48 carrying a gear wheel 49 (see Fig. 3), the lower edge of which meshes with a pinion 50. This pinion 50 Fig. 5ª constitutes a clutch member which may be driven from a large co-axial gear wheel 51, the lower edge of which meshes with a pinion 52 which is carried by the shaft 53 of the measuring roller 6. Now, when the measuring roller 6 is rotated, the pinion 52 rotates the gear wheel 51 which rotates the pinion 50 through a clutch connection; the pinion 50 rotates the large gear wheel 49, the sleeve 48 of which rotates the gear 47 which drives the idler 46 (see Fig. 6), which meshes with the gear wheel 45. The sleeve 48 rotates a horizontal shaft 54, the outer end of which is rotated in an outboard bearing 55, and this shaft carries an indicating dial or wheel 56; this wheel 56 carries numbers indicating inches and yard fractions, and it makes one complete revolution for every yard measured. The chart 42 carries computed figures which lie opposite to corresponding figures on a fixed scale 57; the numbers on the fixed scale indicating prices per yard. The chart 42 also carries a row of numbers, such as the number "2" indicated at 58, and these numbers indicate the number of yards which have been measured, for example, as the machine is now set, it indicates that a measurement of exactly two yards of cloth has been taken, which means that the dial 56 will have made two complete revolutions; if the price of the goods was 39¢ per yard the number "78" opposite to this point on the scale would indicate 78¢.

We provide returning mechanism for returning the indicating mechanism to zero after a measuring operation, and this returning mechanism includes the clutch connection referred to above, and the spring associated with the drum 43 for rewinding the chart 42 upon the drum when the clutch is open. The spring for rewinding the chart 42 on the drum 43 is simply a coil-spring 59 (see Fig. 7), one end of which is fixed to the shaft 60 of the drum, the other end of the spring being fixed to a head of the drum at 61; the drum is loose on this shaft. With this construction, it will be evident that as the chart is wound off of the drum 43, the spring 59 will be wound up or placed in increased tension. The operation of the spring is simply to rotate the drum 43 when the clutch is open.

We shall now describe the clutch, but it should be understood that any suitable clutch mechanism may be provided for opening the driving gear train from the measuring roller to the take-up roller. In the present instance, the pinion 50 referred to above is attached to a clutch member 62 (see Fig. 5ª) and these parts are fixed on a slidable shaft 63, the inner end of which is guided to slide in the frame plate 21 and the outer end of which is mounted to slide through the hub of gear wheel 51 which is rotatably mounted in a bracket 64. A coil spring 65 disposed around the shaft 63 thrusts against a collar 66 pinned or fixed on the shaft, and pulls the clutch member 62 against a conical counterbore 67 in the face of the gear 51. With this construction, it will be evident that by shoving inwardly on the outer end of the clutch shaft 63, the clutch member 62 will be moved away from the gear wheel 51 which constitutes the female clutch member.

Figure 4:
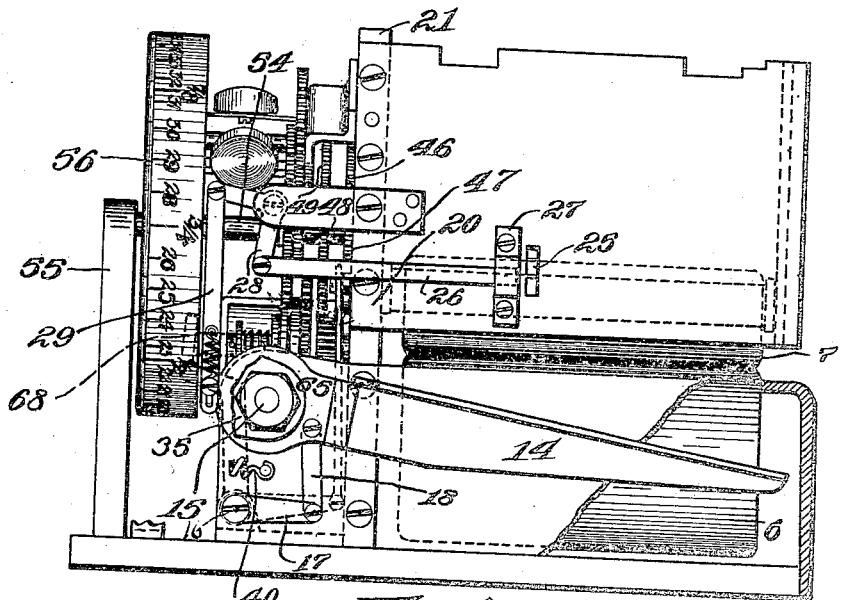
Figure 4 is a view similar to Figure 3, but showing the controlling member in its depressed position.

Any suitable means may be provided for shifting the shaft 63 by the operation of the controlling member 14. This may be accomplished by means of an arm 68 which is rigid with the aforesaid rock-shaft 16 (see Fig. 7), and which extends upwardly for this purpose, the upper portion of the arm 68 being off-set in an outward direction, (see Fig. 4). With this relation of parts, it will be evident that when the controlling member 14 is moved downwardly as indicated in Figure 4, the arm 68 will be moved inwardly so as to open the clutch. This will therefore, control the returning means, that is to say, it will permit the spring 59 to return the indicating mechanism to the starting point, or its zero position.

In positioning the fabric in the machine to start a measurement, the presser-roller 7 is held raised and away from the measuring roller (see Fig. 7); after the forward edge of the fabric is aligned with the guide or slot 14$^a$ (see Fig. 1), the controlling member or lever 14 should be depressed. Depressing the controlling lever 14 in this way exerts a thrust in the link 29 and thereby withdraws the latch from above the arm 25; this permits the presser-roller to descend upon the measuring roller. The controlling lever is provided with aligning or guiding means for indicating where the forward edge of the fabric should be when the measurement is started. This guiding means may operate also as a guide for shears in marking the edge of the fabric. For this purpose, we prefer to employ a slot 14$^a$ in the lever 14. For convenience the slot may align with the edge 14$^b$ of the lever.

In the operation of the machine, the cloth or other fabric to be measured, is pulled through the gap 4 between the rollers 6 and 7, and rotates the measuring roller 6, the shaft 53 of which rotates pinion 52 (see Fig. 6) carried thereby, and from this pinion rotation is imparted through the gear train described above, to the gear wheel 45 carried by the shaft 44 of the take-up roller 41. The rotation of this take-up roller 41 draws the web or chart from the drum 43 so that the numbers carried by the chart appear opposite the numbers on the scale 57. Rotation of the measuring roller is also transmitted through the horizontal shaft 54 to the measuring dial or wheel 56 which indicates yard fractions, the total number of yards being indicated by the numbers which appear at the point 58 (see Fig. 1).

After the desired quantity of cloth has been pulled through the machine, and the measurement and cost has been noted by the operator, he notches or snips the edge of the fabric by applying the end of his shears at the guide or slot 14$^a$ in the controlling lever. The operator then raises the controlling lever which rocks the rock-shaft 16 (see Fig. 7), and exerts an upward thrust in the link 20. This raises the frame of the presser-roller and when it has been raised sufficiently, the latch 26 (see Fig. 3) slips over the arm 25 and latches the presser-roller in its raised position. The downward movement of the controlling member 14 effects the return of the indicating mechanism to zero by means of the arm 68 (see Fig. 7) which shifts the shaft 63 of the clutch longitudinally (see Fig. 5$^a$). As soon as the clutch is opened in this way, the spring 59 returns the indicating mechanism to zero (see Fig. 7).

By reason of the fact that the aligning point for the fabric on the controlling lever is a considerable distance from the point where the fabric emerges from the casing of the machine, it will be evident that there will be sufficient fabric beyond the casing to enable the fabric to be pulled through the machine with facility. This feature tends to prevent a careless operator of the machine from pulling the fabric too far through the machine before starting the measuring. Consequently this machine prevents loss to the retailer by carelessly made slight over-measurements.

What we claim and desire to secure by Letters Patent is:

1. In a fabric measuring and cost-computing machine, the combination of a casing, a measuring roller mounted therein, a presser-roller co-operating with the measuring roller to press the fabric against the same, indicating mechanism actuated by the measuring-roller, returning means for returning the indicating mechanism to zero, and a controlling member with means for effecting the raising and lowering of the presser-roller and means actuated by the controlling member for controlling the operation of the returning means.

2. In a fabric measuring and cost-computing machine, the combination of a casing, a measuring roller mounted therein, a presser-roller co-operating with the measuring roller to press the fabric against the same, indicating mechanism actuated by the measuring roller, returning means for returning the indicating mechanism to zero, a controlling member, means for normally holding the same in a neutral position, means for connecting the controlling member with the presser-roller for controlling the same by a movement of the controlling member in one direction, and means actuated by a movement of the controlling member in the other direction for controlling the returning means.

3. In a fabric measuring and cost-computing machine, the combination of a casing, a measuring roller mounted therein, a presser-roller co-operating with the measuring roller to press the fabric against the same, indicating mechanism actuated by the measuring roller, returning means for returning the indicating mechanism to zero, a presser roller frame carrying the presser-roller, a spring cooperating therewith to force the presser-roller toward the measuring roller, a latch for latching the presser-roller frame when raised to hold the same away from the measuring roller, a controlling member normally disposed in a neutral position, means connecting the same with said presser-roller frame to raise the presser-roller frame and thereby enable the latch to detain the presser-roller frame and hold it away from the measuring roller, said means being actuated by a movement of the controlling member in one direction, means actuated by the downward movement of the controlling member for controlling the returning means and thereby effect the return of the indicating mechanism to zero, and means for actuating the latch by a movement of the controlling member in a downward direction, to release the presser-roller frame and permit the presser-roller to descend upon the measuring roller.

4. In a fabric measuring and cost-computing machine, the combination of a casing, a measuring roller mounted therein, a presser-roller and a spring therefor co-operating with the measuring roller to press the fabric against the same, indicating mechanism actuated by the measuring roller, a controlling member movable in a plane substantially at right angles to the path of the fabric, means connecting the same with the presser-roller to move the presser-roller away from the measuring roller, actuated by a movement of the controlling member in one direction, a latch for latching the presser-roller away from the measuring roller, and means actuated by a movement of the controlling member in the other direction to unlatch, and thereby release, the presser-roller.

5. In a fabric measuring and cost-computing machine, the combination of a casing, a measuring roller mounted therein, a presser-roller and a spring therefor co-operating with the measuring roller to press the fabric against the same, indicating mechanism actuated by the measuring roller, a lever extending longitudinally with the measuring roller and lying adjacent to the plane of movement of the fabric in passing through the machine, means connecting the lever with the presser-roller to move the presser-roller away from the measuring roller, actuated by a movement of the lever in one direction, a latch for latching the presser-roller away from the measuring roller, means connecting the lever with the latch to actuate the latch to release the presser-roller by the movement of the controlling member in the opposite direction, and a spring associated with the lever for normally holding the same in a neutral position.

6. In a fabric measuring and cost-computing machine, the combination of a casing, a measuring roller mounted therein, a presser-roller co-operating with the measuring roller to press the fabric against the same, indicating mechanism actuated by the measuring roller, returning means for returning the indicating mechanism to zero, a lever extending substantially parallel with the measuring roller, means actuated by a movement of the lever in one direction to move the presser-roller away from the measuring roller, a latch with means for actuating the same, to latch the presser-roller away from the measuring roller, means actuated by the movement of the lever in the same direction to actuate the returning means for the indicating mechanism to return the same to zero and means actuated by a movement of the lever in the other direction to release the latch.

7. In a fabric measuring and cost-computing machine, the combination of a casing, a measuring roller mounted therein, a presser-roller, a movable presser-roller frame carrying the presser-roller, a spring co-operating therewith to force the presser-roller toward the measuring roller, a latch for latching the presser-roller away from the measuring roller, a controlling member normally lying in a neutral position and movable in either direction from the neutral position, means actuated by a movement of the controlling member in one direction for moving the latch to release the presser-roller frame, and thereby permit the presser-roller to come against the measuring roller, and means including a lost-motion device for connecting the controlling member with the movable frame, and actuated by a movement of the lever in the other direction, said lost-motion device permitting the movement of the presser-roller toward the measuring roller when said latch is released.

8. In a fabric measuring and cost-computing machine, the combination of a casing, a measuring roller mounted therein, a presser-roller, a movable presser-roller frame carrying the presser-roller, a spring co-operating therewith to force the presser-roller toward the measuring roller, a latch for latching the presser-roller away from the measuring roller, a controlling member normally lying in a neutral position and movable in either direction from the neutral position, means actuated by a movement of the controlling member in one direction for moving the latch to release the presser-roller frame, and thereby permit the presser-roller to come against the measuring roller, and means including a lost-motion connection to permit the movement of the latch independently of the controlling member to latch the presser-roller frame, and means for connecting the controlling member with the movable frame and actuated by a movement of the controlling member in the other direction, for raising the presser-roller frame.

9. In a fabric measuring and cost-computing machine, the combination of a measuring roller, a presser-roller frame carrying the presser-roller, a spring co-operating therewith to force the presser-roller toward the measuring roller, a latch for latching the presser-roller away from the measuring roller, a controlling lever having a connection with the presser-roller frame for raising the presser-roller frame when the lever is moved in one direction, said connection constructed to permit the movement of the presser-roller frame toward the measuring roller when the same is unlatched, and a connection from the controlling lever to the latch for moving the latch to release the presser-roller frame, said connection constructed to permit the independent movement of the latch to latch the presser-roller frame when the same is raised.

10. In a fabric measuring and cost-computing machine, the combination of a casing, a measuring roller mounted to rotate on a fixed axis therein, a presser-roller co-operating with the measuring roller, a movable presser-roller frame carrying the presser-roller indicating mechanism, a clutch for actuating the same by the measuring roller, a lever mounted adjacent to the path of movement of the fabric, a spring for returning the indicating mechanism to zero, means actuated by said lever for opening the clutch to effect the return to zero, and means actuated by the lever for controlling the presser-roller.

11. In a fabric measuring and cost-comuting machine, the combination of a casing, a measuring roller mounted therein, a presser-roller co-operating with the measuring roller to press the fabric against the same, indicating mechanism actuated by the measuring roller, a movable controlling member adjacent to the path of movement of the fabric in passing between rollers, means actuated thereby for actuating the presser-roller, said controlling member having means for indicating the point for marking the edge of the fabric where the same is to be detached.

12. In a fabric measuring and cost-computing machine, the combination of a casing, a measuring roller mounted therein, a presser-roller co-operating with the measuring roller to press the fabric against the same, indicating mechanism actuated by the measuring roller, returning means for returning the indicating mechanism to zero, and a controlling member, means connecting the same with the presser-roller for actuating the presser-roller and means actuated by the controlling member for controlling the operation of the returning means, said controlling member being disposed adjacent to the path of the fabric in passing between the rollers and having a guide formed thereon to indicate the point of application of shears to notch the measured fabric at the point where it is to be detached.

13. In a fabric measuring and cost-computing machine, the combination of a casing, a measuring roller mounted therein, a presser-roller co-operating with the measuring roller to press the fabric against the same, indicating mechanism actuated by the measuring roller, a controlling member mounted adjacent to the path of movement of the fabric in passing between the rollers and across the upper side of which the fabric passes, and means connecting said controlling member with the presser-roller for effecting the raising or lowering of the same, said controlling member having a slot formed therein operating as an aligning point for the forward edge of the fabric and as a guide for shears in notching the edge of the fabric where it is to be cut off.

14. In a fabric measuring and cost-computing machine, the combination of a casing having a gap therethrough, through which the fabric is pulled in measuring the same, a measuring roller and a co-operating presser-roller within the casing, indicating mechanism actuated by the measuring roller, a controlling member extending across the path of movement of the fabric at a point removed from the side of the casing where the fabric emerges from the gap, and means connecting said controlling member with the presser-roller for effecting the raising or lowering of the same, said controlling member having an aligning edge for the forward edge of the fabric and operating as a guide for shears in notching the edge of the fabric where it is to be cut off.

15. In a fabric measuring and cost-computing machine, the combination of a casing having a gap therethrough, through which the fabric is pulled in measuring the same, a measuring roller and a co-operating presser-roller within the casing, indicating mechanism actuated by the measuring roller, returning means for returning the indicating mechanism to zero, a controlling member extending across the path of movement of the fabric at a point removed from the side of the casing where the fabric emerges from the gap, means connecting said controlling member with the presser-roller for moving the presser-roller away from the measuring roller, latching means for holding the presser-roller away from the measuring roller, means connecting said controlling member with the latching means to actuate the same to permit the presser-roller to descend upon the measuring roller, and means connected with the controlling member for actuating the returning means to effect the return of the indicating mechanism to zero.

16. In a fabric measuring and cost-computing machine, the combination of a casing having a gap therethrough, through which the fabric is pulled in measuring the same, a measuring roller and a co-operating presser-roller within the casing, indicating mechanism actuated by the measuring roller, returning means for returning the indicating mechanism to zero, a controlling member extending across the path of movement of the fabric at a point removed from the side of the casing where the fabric emerges from the gap, means connecting said controlling member with the presser-roller for moving the presser-roller away from the measuring roller, latching means for holding the presser-roller away from the measuring roller, means connecting said controlling member with the latching means to actuate the same to permit the presser-roller to descend upon the measuring roller, and means connected with the controlling member for controlling the returning means to effect the return of the indicating mechanism to zero, said controlling member having a guide formed therein operating as an aligning point for the forward edge of the fabric and for guiding shears in notching the edge of the fabric where it is to be cut off.

17. In a fabric measuring and cost-computing machine, the combination of a casing, a measuring roller mounted therein, a presser-roller, a movable presser-roller frame carrying the presser-roller, a spring co-operating therewith to force the presser-roller toward the measuring roller, a latch for latching the presser-roller away from the measuring roller, a controlling member normally lying in a neutral position and movable in either direction from the neutral position, means including a pin and slot connecting the lever with the latch and actuated by a movement of the lever in one direction to release the presser-roller and thereby permit the presser-roller to come against the measuring roller, a spring associated with the latch, and means including a pin and slot for connecting the lever with the presser-roller frame and actuated by a movement of the lever in the other direction for moving the presser-roller frame away from the measuring roller.

18. In a fabric measuring and cost-computing machine, the combination of a measuring roller, a presser-roller having means for forcing the same toward the measuring roller, a controlling member mounted so that it may be raised or moved downwardly, latching means for holding the presser-roller frame up after the same has been raised, means for normally holding the controlling member in a neutral position, indicating mechanism, means for returning the indicating mechanism to zero, means connecting the said controlling member to said last named means to actuate the same to effect the return of the indicating mechanism to zero when the controlling member is moved downwardly, means connecting the controlling member with the presser-roller latching means for releasing the same to effect a downward movement of the presser-roller when the controlling member is moved downwardly, and means co-operating with the controlling member and the presser-roller for raising the presser-roller when the controlling member is raised.

19. In a fabric measuring and cost-computing machine, the combination of a casing, a measuring roller mounted therein, a presser roller disposed above the measuring roller and cooperating therewith, a pivotally mounted presser roller frame carrying the presser roller, indicating mechanism, a clutch for driving the same by the measuring roller, a lever mounted adjacent to the path of movement of the fabric, a spring connected with the indicating mechanism for returning the same to zero, means actuated by said lever for opening the clutch to enable the spring to effect the return to zero, and means actuated by the lever for moving the presser roller toward or from the measuring roller.

20. In a fabric measuring and cost-computing machine, the combination of a measuring roller, a movably mounted presser roller co-operating with the measuring roller, indicating mechanism, a clutch for driving the same by the measuring roller, a lever mounted adjacent to the path of movement of the fabric, a spring connected with the indicating mechanism for returning the same to zero, means actuated by said lever for opening the clutch to enable the spring to effect the return to zero, and means also actuated by the lever for moving the presser roller toward or from the measuring roller.

In testimony whereof, we have hereunto set our hands.

G. CARLTON HOSCH.
GEO. B. KYLE.